(12) United States Patent
Hovanky et al.

(10) Patent No.: US 7,071,591 B2
(45) Date of Patent: Jul. 4, 2006

(54) ELECTROMAGNETIC CIRCUIT AND SERVO MECHANISM FOR ARTICULATED CAMERAS

(75) Inventors: Thao D. Hovanky, Austin, TX (US); Richard G. Washington, Marble Falls, TX (US)

(73) Assignee: CoVi Technologies, Austin, TX (US)

( * ) Notice: Subject to any disclaimer, the term of this patent is extended or adjusted under 35 U.S.C. 154(b) by 0 days.

(21) Appl. No.: 10/732,195

(22) Filed: Dec. 10, 2003

(65) Prior Publication Data
US 2004/0189130 A1   Sep. 30, 2004

Related U.S. Application Data

(60) Provisional application No. 60/437,711, filed on Jan. 2, 2003.

(51) Int. Cl.
*H02K 21/26* (2006.01)
(52) U.S. Cl. .............................................. 310/154.25
(58) Field of Classification Search .......... 310/154.25, 310/267, 268
See application file for complete search history.

(56) References Cited

U.S. PATENT DOCUMENTS

| | | | |
|---|---|---|---|
| 3,558,947 A * | 1/1971 | Burr ...................... | 310/154.06 |
| 3,837,229 A | 9/1974 | Stiles et al. | |
| 4,072,881 A * | 2/1978 | Ban .......................... | 318/138 |
| 4,076,561 A | 2/1978 | Lee et al. | |
| 4,086,509 A | 4/1978 | Manson | |
| 4,093,897 A | 6/1978 | Fujita et al. | |
| 4,104,787 A | 8/1978 | Jandeska et al. | |
| 4,123,297 A | 10/1978 | Jandeska et al. | |
| 4,144,060 A | 3/1979 | Jandeska et al. | |
| 4,151,435 A | 4/1979 | Jandeska et al. | |
| 4,209,213 A | 6/1980 | Wussow | |
| 4,281,328 A | 7/1981 | Shores | |
| 4,322,145 A * | 3/1982 | Yamada et al. ............. | 396/235 |
| 4,325,757 A | 4/1982 | Jandeska et al. | |
| 4,390,262 A * | 6/1983 | Hirohata et al. ............ | 396/449 |
| 4,404,560 A | 9/1983 | Williams, Jr. | |
| 4,424,974 A | 1/1984 | Mitsuya et al. | |
| 4,496,395 A | 1/1985 | Croat | |
| 4,551,645 A * | 11/1985 | Takahashi et al. ............ | 310/46 |
| 4,558,320 A | 12/1985 | Pedrazza | |
| 4,563,683 A | 1/1986 | Tanaka et al. | |
| 4,568,847 A * | 2/1986 | Schmider .................... | 310/268 |

(Continued)

FOREIGN PATENT DOCUMENTS

GB      2209438 A  *  5/1989

(Continued)

OTHER PUBLICATIONS

Copending U.S. Appl. No. 10/732,924, Filed Dec. 10, 2003, "Slip Ring Apparatus" (COVI:005).

(Continued)

*Primary Examiner*—Joseph Waks
(74) *Attorney, Agent, or Firm*—O'Keefe, Egan & Peterman LLP

(57) ABSTRACT

An electromagnetic circuit that may be advantageously employed in an articulated camera, such as a CCTV camera, as a part of a servo mechanism to directly drive the camera and optical lens assembly, for example, in the pan and/or tilt axes. In one embodiment, the coil assembly of the servo mechanism may comprise four separate coils that rotate about the center of the ring shape of a single one-piece ring-shaped permanent magnet that has been pre-magnetized in two pair of opposing polarities. The magnet assembly that includes the magnet ring, may be bonded to a circular plate made of ferrous metal.

63 Claims, 11 Drawing Sheets

U.S. PATENT DOCUMENTS

| | | | |
|---|---|---|---|
| 4,588,439 A | | 5/1986 | Narasimhan et al. |
| 4,633,149 A | * | 12/1986 | Welterlin .................. 318/254 |
| 4,684,179 A | | 8/1987 | Freeman |
| 4,694,235 A | | 9/1987 | Flowers |
| 4,770,723 A | | 9/1988 | Sagawa et al. |
| 4,792,367 A | | 12/1988 | Lee |
| 4,792,368 A | | 12/1988 | Sagawa et al. |
| 4,802,931 A | | 2/1989 | Croat |
| 4,845,411 A | | 7/1989 | Smith |
| 4,849,035 A | | 7/1989 | Stadelmaier et al. |
| 4,851,058 A | | 7/1989 | Croat |
| 4,921,551 A | | 5/1990 | Vernia et al. |
| 4,922,145 A | * | 5/1990 | Shtipelman ............... 310/49 R |
| 5,111,288 A | | 5/1992 | Blackshear |
| 5,122,702 A | | 6/1992 | Nakazato |
| 5,172,039 A | | 12/1992 | Owens |
| 5,267,144 A | | 11/1993 | Yoshida et al. |
| 5,280,209 A | * | 1/1994 | Leupold et al. ........ 310/156.41 |
| 5,349,258 A | * | 9/1994 | Leupold et al. ........ 310/154.43 |
| 5,355,043 A | | 10/1994 | Kaneda |
| 5,473,368 A | | 12/1995 | Hart |
| 5,475,209 A | | 12/1995 | Nabeshima |
| 5,484,294 A | | 1/1996 | Sobhani |
| 5,568,192 A | | 10/1996 | Hannah |
| 5,633,681 A | | 5/1997 | Baxter et al. |
| 5,645,651 A | | 7/1997 | Fujimura et al. |
| 5,748,995 A | | 5/1998 | Kitagawa et al. |
| 5,814,962 A | | 9/1998 | Mizumoto |
| 5,828,503 A | | 10/1998 | Kaneda et al. |
| 5,901,429 A | | 5/1999 | Crockett |
| 5,974,464 A | | 10/1999 | Shin et al. |
| 5,990,774 A | * | 11/1999 | Leupold ..................... 335/306 |
| 6,036,637 A | | 3/2000 | Kudo |
| 6,049,149 A | * | 4/2000 | Lin et al. .................. 310/68 R |
| 6,049,967 A | | 4/2000 | Feuer, Jr. et al. |
| 6,087,915 A | * | 7/2000 | Leupold ..................... 335/284 |
| 6,089,875 A | | 7/2000 | Iwata et al. |
| 6,104,114 A | | 8/2000 | Takeda et al. |
| 6,222,297 B1 | | 4/2001 | Perdue |
| 6,249,505 B1 | | 6/2001 | Miyamoto et al. |
| 6,268,882 B1 | * | 7/2001 | Elberbaum ................. 348/151 |
| 6,283,638 B1 | | 9/2001 | Feuer, Jr. et al. |
| 6,356,308 B1 | | 3/2002 | Hovanky |
| 6,382,848 B1 | * | 5/2002 | Nakano ...................... 396/464 |
| 6,392,693 B1 | | 5/2002 | Wakiyama et al. |
| 6,605,883 B1 | | 8/2003 | Isozaki et al. |
| 6,612,848 B1 | | 9/2003 | Brundage |
| 6,628,338 B1 | * | 9/2003 | Elberbaum et al. ......... 348/373 |
| 6,705,774 B1 | | 3/2004 | Tashiro et al. |
| 6,756,759 B1 | | 6/2004 | Yamashita |
| 6,815,729 B1 | | 11/2004 | Brophy et al. |
| 6,880,987 B1 | * | 4/2005 | Diana et al. ................ 396/427 |

FOREIGN PATENT DOCUMENTS

| | | | |
|---|---|---|---|
| JP | 0908204 A | * | 11/1977 |
| JP | 2003259618 A | * | 9/2003 |
| SU | 1487126 A | * | 6/1989 |

OTHER PUBLICATIONS

DVD-ROM Spindle Motor, Eutronic Technology Co., Ltd., Rev. 1.1., Dec. 2, 2002, 9 pgs.

Photograph Of Product Available From Teac Corporation Prior To The Jan. 2, 2003 filing date of U.S. Appl. No. 60/437,711, From Which The Present Application Claims Priority (See Text Of Accompanying Information Disclosure Statement For Description).

Photograph Of Product Available From PictureTel Corporation Prior To The Jan. 2, 2003 filing date of U.S. Appl. No. 60/437,711 From Which The Present Application Claims Priority (See Text Of Accompanying Information Disclosure Statement For Description).

Ferro Tec USA, Domain Detection, http:/www.ferrotec.com/usa/domain_detection.htm, 2 pgs., printed off Internet on Dec. 5, 2003, and labeled "© 2001-2003".

Ferro Tec USA, Ferrofluid Technology Overview, http:/www.ferrotec.com/usa/ferrofluid_technology_overview.htm, 3 pgs., printed off Internet on Dec. 5, 2003, and labeled "© 2001-2003".

Ferro Tec USA, Optical Pick Ups, http:/www.ferrotec.com/usa/optical_pickups.htm, 2 pgs., printed off Internet on Dec. 5, 2003, and labeled "© 2001-2003".

Ferro Tec USA, Other Applications, http:/www.ferrotec.com/usa/other_applications.htm, 2 pgs., printed off Internet on Dec. 5, 2003, and labeled "© 2001-2003".

Ferro Tec USA, Educational Kits, http:/www.ferrotec.com/usa/educational_kits.htm, 2 pgs., printed off Internet on Dec. 5, 2003, and labeled "© 2001-2003".

Ferro USA Corporation, Company profile, http:/www.avem.org/MemDirF/Ferro.html, 2 pgs., printed off Internet on Dec. 5, 2003.

Ferrofluidics Exclusion Seal Applications Manual, 1987, 14 pgs.

Data Sheet, Discrete Semiconductors, "KMZ10C Magnetic Field Sensor", Philips Semiconductors, Mar. 24, 1998, 8 pgs.

* cited by examiner

ELECTROMAGNETIC CIRCUIT AND SERVO MECHANISM FOR ARTICULATED CAMERAS

This patent application claims priority to copending U.S. Provisional Patent Application Ser. No. 60/437,711, filed Jan. 2, 2003, and entitled "ELECTROMAGNETIC CIRCUIT AND SERVO MECHANISM FOR ARTICULATED CAMERAS" by Hovanky, the entire disclosure of which is incorporated herein by reference.

BACKGROUND OF THE INVENTION

The present invention relates generally to cameras, and more particularly to articulated cameras such as may be employed in closed circuit television ("CCTV") applications.

Current articulated camera technology typically relies on conventional stepper or DC motors to drive and articulate the optical block and camera assembly in the pan and tilt axes. Such conventional camera articulation technology typically requires gear or belt drive assemblies to achieve the angular resolution required to articulate the camera and position the lens. Due to the number of gear or belt drive components typically required for such articulated camera applications, the camera's reliability is compromised. In addition, driving a stepper motor requires continuous pulsing of electrical current into the motor's armature windings. Said pulsing current results in a high amount of power consumption which in turn, causes a negative effect on the camera system's Mean Time Between Failure ("MTBF").

SUMMARY OF THE INVENTION

Disclosed herein is an electromagnetic circuit apparatus that may be advantageously employed in an articulated camera, such as a CCTV camera, as a part of a servo mechanism to directly drive and articulate the optical block and associated camera assembly of the CCTV (e.g., rotate the optical block and camera assembly about an axis), for example, in the pan axis (e.g., rotation of the optical block and associated camera assembly about a vertical axis) and/or the tilt axis (e.g., rotation of the optical block and associated camera assembly about a horizontal axis). In one exemplary embodiment, the coil assembly of a servo mechanism may comprise four separate coils that rotate about the center of the ring shape of a continuous one-piece ring-shaped permanent magnet that has been pre-magnetized in at least two pair of opposing polarities. In this embodiment, the magnet assembly that includes the ring-shaped magnet may be optionally bonded to a circular plate made of ferrous metal. Advantageously, the disclosed electromagnetic circuit apparatus and servo mechanisms may employ voice coil motor actuation. The principal behind voice coil motor actuation is an imbedded coil which generates a force when placed in a magnetic field and subjected to an electric current.

In one exemplary embodiment disclosed herein, an electromagnetic circuit and servo mechanism may advantageously employ one or more coil/s to configure a coil assembly that is the only moving component or movable section of the servo mechanism, allowing for both high-speed motion and accurate positioning. In this exemplary embodiment, the magnet assembly is stationary. Because the coil assembly has a lower angular inertial mass than the magnet assembly, it may be used to so configure a movable section of a servo mechanism that is advantageously capable of starting and stopping more quickly than a movable section of a servo mechanism that is configured with a moving magnet assembly. Further advantageously, a coil assembly may be so employed to provide a movable section of a servo mechanism that is much lighter and has much less rotational inertia per given unit height than the moving sections of conventional types of electric motors. As a result of this light inertial mass, the power consumption of the disclosed electromagnetic circuit and servo mechanism may be kept to a minimum. However, it will be understood that any other configuration of coil assembly relative to magnet assembly is possible that is suitable for achieving the features of the electromagnetic circuit and servo mechanism disclosed herein. For example, in an alternate embodiment, the coil assembly may be stationary and the magnet assembly may be the moving component.

An exemplary four coil assembly configuration is illustrated and described herein. Advantages of such a four coil assembly configuration include reduction or substantial elimination of high torque ripple as the coils switch magnetic phases, a phenomenon that may be experienced with two coil configurations. When a coil assembly is implemented as part of a servo mechanism to drive and articulate the optical block and associated camera assembly of an articulated camera, such magnetic phase switching may cause, for example, a small perturbation to the line of sight ("LOS") of the articulated camera and hence a minute interruption of video output from the camera due to the non-linear phase transition. The illustrated four coil configuration may thus be employed in one embodiment to achieve cost effectiveness while helping to ensure that torque ripple due to magnetic phase switching is kept to a minimum. However, although illustrated and described herein with reference to an exemplary coil assembly configuration that includes a set of four coils, other coil assembly configurations may be suitably employed in the practice of the disclosed systems and methods, e.g., more than four coils, less than four coils, six or more coils, etc. It will also be understood that any multiple coil arrangement (other than four coil arrangements) helps reduce torque ripple due to magnetic phase switching, e.g., two or more coils. However, a greater number of coils tend to provide greater benefit.

The exemplary embodiments illustrated herein may also employ an exemplary single magnet configuration, in which a single magnet is employed that may be characterized as a one-piece or multiple-piece magnet having two or more sets of magnetic poles that is configured in a continuous ring shape. As used herein, "continuous magnet" means a magnet configured as a single structure (e.g. a single ring-shaped structure) having no spaces or gaps defined therein. In this regard, a continuous magnet may be composed of one piece of magnetic material (e.g., configured in the shape of a ring), or may be composed of multiple-pieces of magnetic material that are coupled together (e.g., adhered or otherwise assembled to each other) in a manner so as to form a continuous structure with no spaces or gaps existing between the individual pieces of magnetic material. A "non-continuous magnet configuration" means any configuration of two or more pieces of magnetic material in which the separate pieces of magnetic material are separated from each other by gaps or spaces.

As disclosed herein, a continuous magnet configuration may be advantageously employed to reduce or substantially eliminate interruptions or jumpiness (e.g., torque ripple) during motor rotation that may occur, for example, when coils rotate across the boundaries of individual separate magnets of a multiple-piece non-continuous magnet configuration. Furthermore, use of a one-piece magnet advantageously reduces assembly cost by eliminating the difficulties associated with aligning discrete separate magnets and the polarity and orientation issues of same that may result in higher assembly cost. In this regard, two or more discrete magnets are typically difficult to assemble because each polarity has to be faced in predefined orientations since the magnets are typically magnetized prior to assembly. In one embodiment, a magnet configured in a continuous shape may be further characterized as a continuous magnet having multiple north-south poles (i.e., a continuous magnet having more than one north pole and having more than one south pole). For example, a continuous magnet may have multiple sets of poles (e.g., more than one set of poles, more than two sets of poles, etc.), with each set of poles including one north and one south pole.

Thus, in one embodiment of the disclosed systems and methods, an electromagnetic circuit and servo mechanism may be implemented in a manner where there is little or no drive torque fluctuation. In such an embodiment, the coil may be configured to operate inside a uniform magnetic field enabling sub-micron positioning while eliminating noise and cogging. These characteristics are ideal for high-speed, high-precision positioning actuators.

Although circular continuous ring-shaped magnets are described and illustrated herein, it will be understood that any other shape of continuous magnet may be employed that is suitable for achieving one or more of the motor functions described elsewhere herein. Examples of such suitable other continuous magnet shapes include, but are not limited to, oval-shaped, hexagonal-shaped, rectangular-shaped, etc. In addition, continuous magnets may be configured with a partial ring shape in those applications where a full 360 degree range of rotation between a coil assembly and magnet assembly is not required. The disclosed apparatus may be advantageously employed in both continuous rotation (i.e. full 360 degree and beyond rotation) and non-continuous rotation (i.e., limited angle rotation of less than 360 degrees) applications. Thus, for example, a full ring shape may be configured for providing 360 degree range of rotation, a half-ring shape may be configured for providing 180 degree range of rotation, a quarter ring shape may be configured for providing 90 degree range of rotation, etc. Furthermore, a cross section of a continuous magnet (e.g., continuous ring-shaped magnet) may be varied to achieve a desired linear torque profile. For a continuous magnet, this may be done, for example, by varying the thickness of the magnet ring at one or more locations around the ring and/or by varying the outer and/or inner periphery of the ring.

Furthermore, it will be understood that in one embodiment a continuous magnet may be composed of one-piece of suitable magnetic material, however in another embodiment a continuous magnet may be composed of multiple-pieces of suitable magnetic material that are coupled together to form a continuous magnet such as continuous ring-shaped magnet. It will yet be further understood that multiple-piece non-continuous magnets may be employed in the practice of yet other embodiments of the disclosed systems and methods, e.g., such as embodiments having coils and other components integrated with a printed circuit board ("PCB"), embodiments having greater than two coils (e.g., four coil embodiments), etc.

In various embodiments of the disclosed electromagnetic circuit and servo mechanism, a number of exemplary features may be advantageously implemented, alone or in combination. Examples of such exemplary features include, but are not limited to using a multiple coil assembly and continuous magnet having at least two sets of poles for actuation of a rotary drive mechanism; an electromagnetic circuit and servo mechanism that employ a moving coil and stationary continuous magnet configuration having at least two sets of poles; an electromagnetic circuit and servo mechanism that employ a moving continuous magnet having at least two sets of poles and a stationary coil configuration; using coils mounted/integrated with a printed circuit board ("PCB") rather than (for example) by insert molding; using coils integrated with a PCB along with other electronic components such as drive and feedback components; achieving minimal spacing or stack height for a given set of elements consisting of (but not limited to) drive circuitry, coil and magnet assembly, and flux path return mechanism; and implementing an electromagnetic circuit and servo mechanism using a one-piece continuous magnet with multiple sets of poles (e.g., greater than one set of poles, greater than two sets of poles, greater than three sets of poles, etc.).

In one respect, disclosed herein is a servo mechanism, including: a coil assembly, the coil assembly including at least one motor coil; and a magnet assembly, the magnet assembly including a one-piece continuous magnet having at least two sets of poles and being configured in a full ring shape. The coil assembly and the magnet assembly may be rotatably coupled together in operative relationship.

In another respect, disclosed herein is a servo mechanism, including: a coil assembly, the coil assembly including at least one motor coil having coil conductor terminals; and a magnet assembly, the magnet assembly including a one-piece continuous magnet having at least two sets of poles and being configured in a full ring shape. The coil assembly and the magnet assembly may be rotatably coupled together so that at least one of the coil assembly and the magnet assembly rotates in response to application of voltage across the coil conductor terminals of the at least one coil.

In another respect, disclosed herein is a rotary drive optical block assembly, including: a coil assembly, a magnet assembly, and an optical block. The coil assembly may include: at least one motor coil having coil conductor terminals, and a coil support platter including a first printed circuit board having first circuitry and first dynamic interface components, the at least one coil being fixedly coupled to the coil support platter. The magnet assembly may be rotatably coupled to the coil assembly so that one of the coil assembly or the magnet assembly is a moving assembly that rotates in response to application of voltage across the coil conductor terminals of the at least one coil, and the other of the coil assembly or the magnet assembly is a stationary assembly. The magnet assembly may include: a continuous magnet having at least two sets of poles, and a second printed circuit board fixedly coupled to the magnet, the second printed circuit board having second circuitry and second dynamic interface components electrically coupled to the first dynamic interface components. The optical block may be coupled to the moving assembly so that the moving assembly imparts rotation to the optical block relative to the stationary assembly when the moving assembly rotates relative to the stationary assembly. The first dynamic interface components of the first printed circuit board and the second dynamic interface components of the second printed circuit board together may form a dynamic signal interface between the first circuitry of the first printed circuit board and the second circuitry of the second printed circuit board.

In another respect, disclosed herein is a method of operating a servo mechanism. The method may include providing a servo mechanism, that includes: a coil assembly, the coil assembly including at least one motor coil having coil conductor terminals, and a magnet assembly, the magnet assembly including a one-piece continuous magnet having at least two sets of poles and being configured in a full ring shape. The coil assembly and the magnet assembly may be rotatably coupled together in operative relationship. The method may include imparting rotation to at least one of the coil assembly or the magnet assembly by applying voltage across the coil conductor terminals of the at least one coil.

In another respect, disclosed herein is a method of rotating an optical block assembly that includes providing a servo mechanism. The servo mechanism may include: a coil assembly including at least one motor coil having coil conductor terminals, and a coil support platter including a first printed circuit board having first circuitry and first dynamic interface components, the at least one coil being fixedly coupled to the coil support platter. The servo mechanism may also include a magnet assembly rotatably coupled to the coil assembly so that one of the coil assembly or the magnet assembly is a moving assembly that rotates in response to application of voltage across the coil conductor terminals of the at least one coil and the other of the coil assembly or the magnet assembly is a stationary assembly. The magnet assembly may include a continuous magnet having at least two sets of poles, and a second printed circuit board fixedly coupled to the magnet, the second printed circuit board having second circuitry and second dynamic interface components electrically coupled to the first dynamic interface components. The first dynamic interface components of the first printed circuit board and the second dynamic interface components of the second printed circuit board together may form a dynamic signal interface between the first circuitry of the first printed circuit board and the second circuitry of the second printed circuit board. The method may also include providing an optical block coupled to the moving assembly of the servo mechanism so that the optical block rotates with the moving assembly of the servo mechanism relative to the stationary assembly of the servo mechanism, imparting rotation to the optical block by applying voltage across the coil conductor terminals of the at least one coil of the coil assembly, and transmitting at least one signal from the first circuitry to the second circuitry across the dynamic signal interface.

In another respect, disclosed herein is a coil assembly for a servo mechanism, including: at least one motor coil having coil conductor terminals; and a coil support platter including a first printed circuit board having first circuitry and first dynamic interface components, the at least one coil being fixedly coupled to the coil support platter. The coil assembly may be configured to be rotatably coupled to a magnet assembly including a second printed circuit board, the second printed circuit board having second circuitry and second dynamic interface components. The first dynamic interface components of the first printed circuit board may be configured to form a dynamic interface together with the second dynamic signal interface components of the second printed circuit board so that the dynamic signal interface electrically couples the first circuitry of the first printed circuit board to the second circuitry of the second printed circuit board.

DESCRIPTION OF ILLUSTRATIVE EMBODIMENTS

Figure 1A:
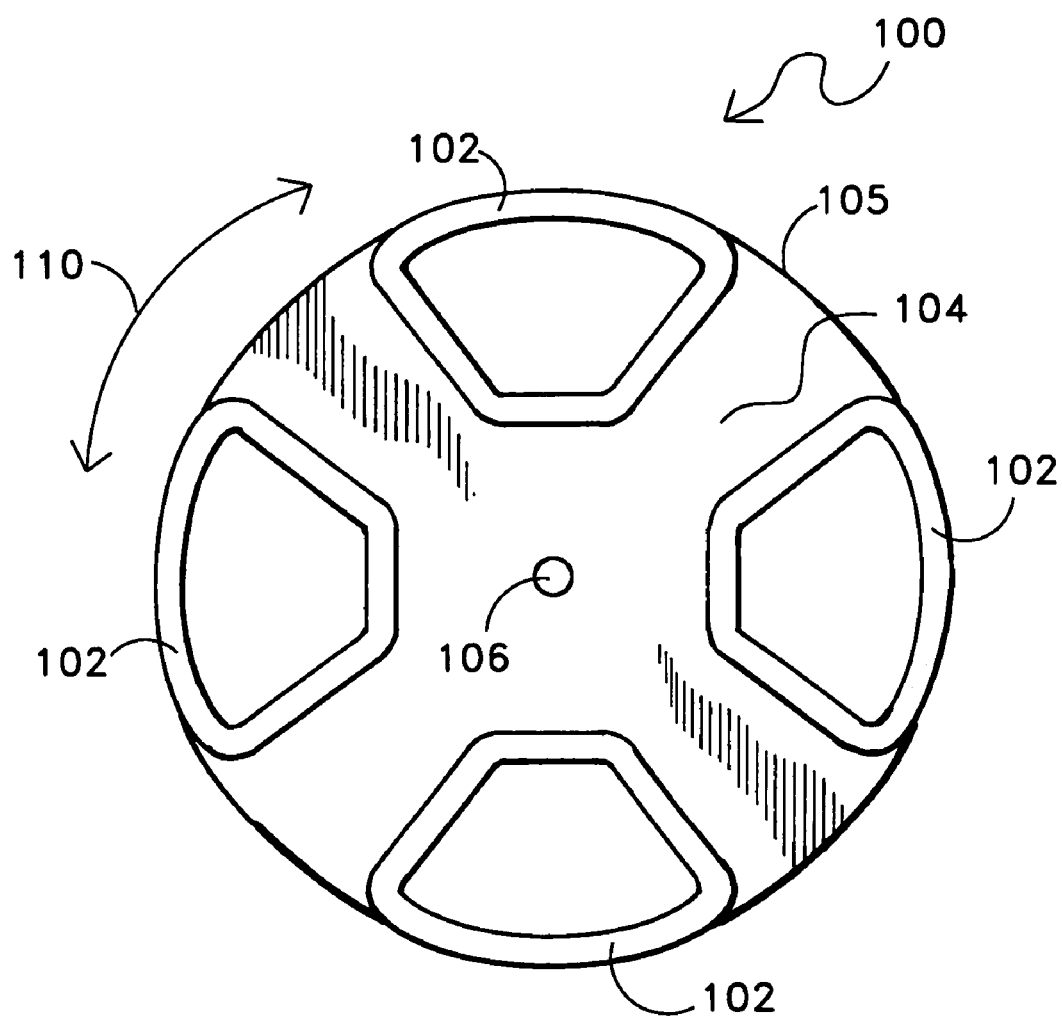
FIG. 1A is a simplified view of a multiple coil assembly according to one embodiment of the disclosed systems and methods.

FIG. 1A illustrates one exemplary embodiment of a multiple coil assembly 100 having four motor coils 102 that are integrated within or otherwise fixedly coupled to a coil support assembly in the form of a circular coil support platter 104. As shown in FIG. 1A, coil support platter 104 may include a rotation point in the form of a central opening 106 for receiving a spindle mechanism in the form of a shaft with or on which coil support platter 104 may rotate in a manner such that rotational motion may be imparted to a drive member (e.g., drive bracket, etc.) by the coil assembly 100. Although an opening 106 is illustrated in FIG. 1A, it will be understood that any other suitable rotation point configuration (e.g., solid platter with more than one attachment point/s for a spindle assembly, etc) may be employed for rotatably coupling a coil support platter to a spindle mechanism that is suitable for allowing a coil assembly to rotate and to transfer rotational motion to a drive member, e.g., for rotationally driving an optical block or other mechanism as described elsewhere herein.

Each of motor coils 102 may be configured in any manner suitable for creation of a magnetic flux in response to an application of voltage across the terminals of the coils, and so that the created current vector of each of the coils interacts with the magnetic flux of an adjacently disposed magnet in a way that creates a force that causes coil assembly 100 to rotate about an axis that coincides with the location of opening 106 and corresponding spindle member in the plane and directions indicated by arrow 110 in FIG. 1A. In this regard, pulse width modulation may be employed in one exemplary embodiment to control rotation of coil assembly 100. By varying polarity of the voltage pulses applied to the terminals of the coils, the direction of rotation of coil assembly 100 may be reversed. Further, by varying the duration of the voltage pulses applied to the terminals of the coils, speed of rotation of coil assembly 100 may be controlled.

In one exemplary embodiment, each of motor coils 102 may be configured with insulated conductor material that is spirally wound around a coil core material that serves to form the geometrical shape of the motor coil 102. FIG. 1 illustrates one exemplary embodiment of a coil assembly 100 having four individual motor coils 102 that each have the geometrical shape shown. In this regard, it will be understood that any other number of individual coils (e.g., more than four motor coils, less than four motor coils, etc.) and/or any other geometrical configuration/s of individual coils (e.g., rectangular, oval, etc.) may be employed that is suitable for configuring a coil assembly that is capable of interacting with and operating in relation to a magnet apparatus in the manner described elsewhere herein. Furthermore, although the structure of each of motor coils 102 is illustrated as extending to the outside boundary 105 of coil support platter 104, it will be understood that other coil support assembly configurations are possible, e.g., part of structure of one or more motor coil/s may alternatively extend in cantilever fashion past the outside boundary of a coil support platter (e.g., as illustrated in FIG. 1B), the outside boundary of a coil support platter may extend beyond the outermost portion of the structure of one or more motor coils, non-platter configurations may be employed in which one or more motor coil/s are cantilevered on separate spoke members extending from a central axis, etc.

Still referring to FIG. 1A, coil support platter 104 may be constructed of any material and have any configuration that is suitable for fixedly coupling motor coils 102 thereto and for transferring rotational motion from motor coils 102 to a drive member coupled to platter 104. Examples of suitable materials for platter 104 include, but are not limited to, plastic, PCB, other lightweight non-ferrous material such as magnesium, etc. When employed as a coil support platter, it will be understood that a PCB may be of conventional PCB material or may be manufactured out of any suitable material including, but not limited to, plastic. Furthermore, although illustrated as having a shape with a circular outline in FIG. 1A, a coil support platter may be configured in other embodiments to have a shape with any other alternative outline (e.g., square, oval, irregular, triangular, etc.) suitable for fixedly coupling to one or more motor coils and operatively performing in manner described elsewhere herein.

In one exemplary embodiment, a coil assembly 100 may be configured with one or more motor coils 102 that are integrated with a coil support platter 104. In this regard, one or more motor coils 102 may be mounted on top of, or otherwise coupled to or incorporated into or onto a coil support platter 104 (e.g., a PCB) to form a moving coil assembly 100. For example, motor coils 102 may be mounted or otherwise positioned within a corresponding feature (e.g., cut-out, channel, indentation, etc.) defined in the surface of a coil support platter 104 to achieve a configuration with reduced height (e.g., so that the coils 102 are co-planar with the coil support platter 104), motor coils 102 may be mounted onto the surface of a coil support platter 104 (e.g., by soldering or adhesive), motor coils 102 may be mounted on top, bottom or combination of top and bottom surfaces of coil support platter 104, etc. By so integrating one or more components of the disclosed electromagnetic circuit and servo mechanism with a coil support platter 104, space requirements may be advantageously reduced as compared to configurations in which such components are separately mounted, e.g., incorporated into molded plastic, etc. Furthermore, a coil support platter 104 may alternatively be formed (e.g., molded, etc.) around one or more motor coil/s 102.

Figure 1B:
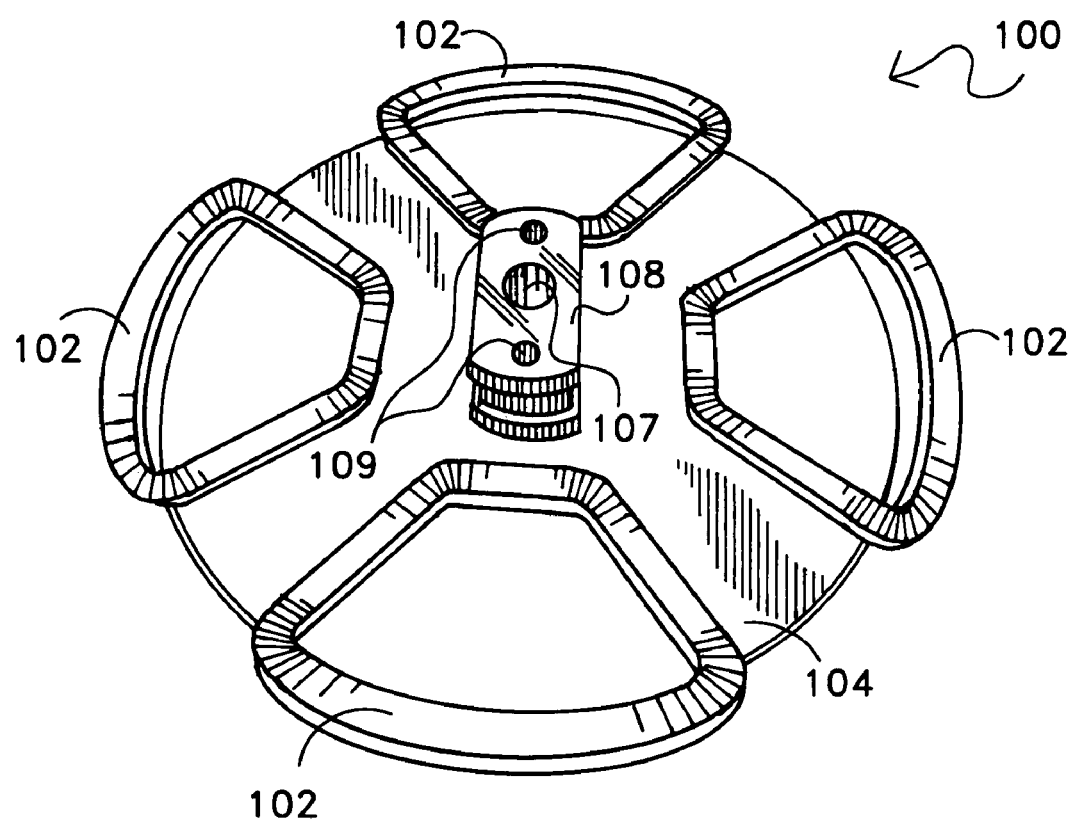
FIG. 1B is a simplified perspective view of a multiple coil assembly according to one embodiment of the disclosed systems and methods.

FIG. 1B illustrates a perspective view of a moving coil assembly 100 that includes four motor coils 102 coupled to a coil support platter 104. In this exemplary embodiment, a drive member in the form of drive bracket 108 is coupled to coil support platter 104 at the axis of rotation of coil assembly 100. As shown, drive bracket 108 may include mounting or fastener holes 109 for attachment to, for example, a camera assembly. A central opening 107 may be defined in bracket 108 for the purpose of attaching a drive shaft to rotate the load. As previously described, FIG. 1B shows how part of the structure of motor coils 102 may be alternately configured to extend in cantilever fashion past the outside boundary of coil support platter 104.

Figure 1C:
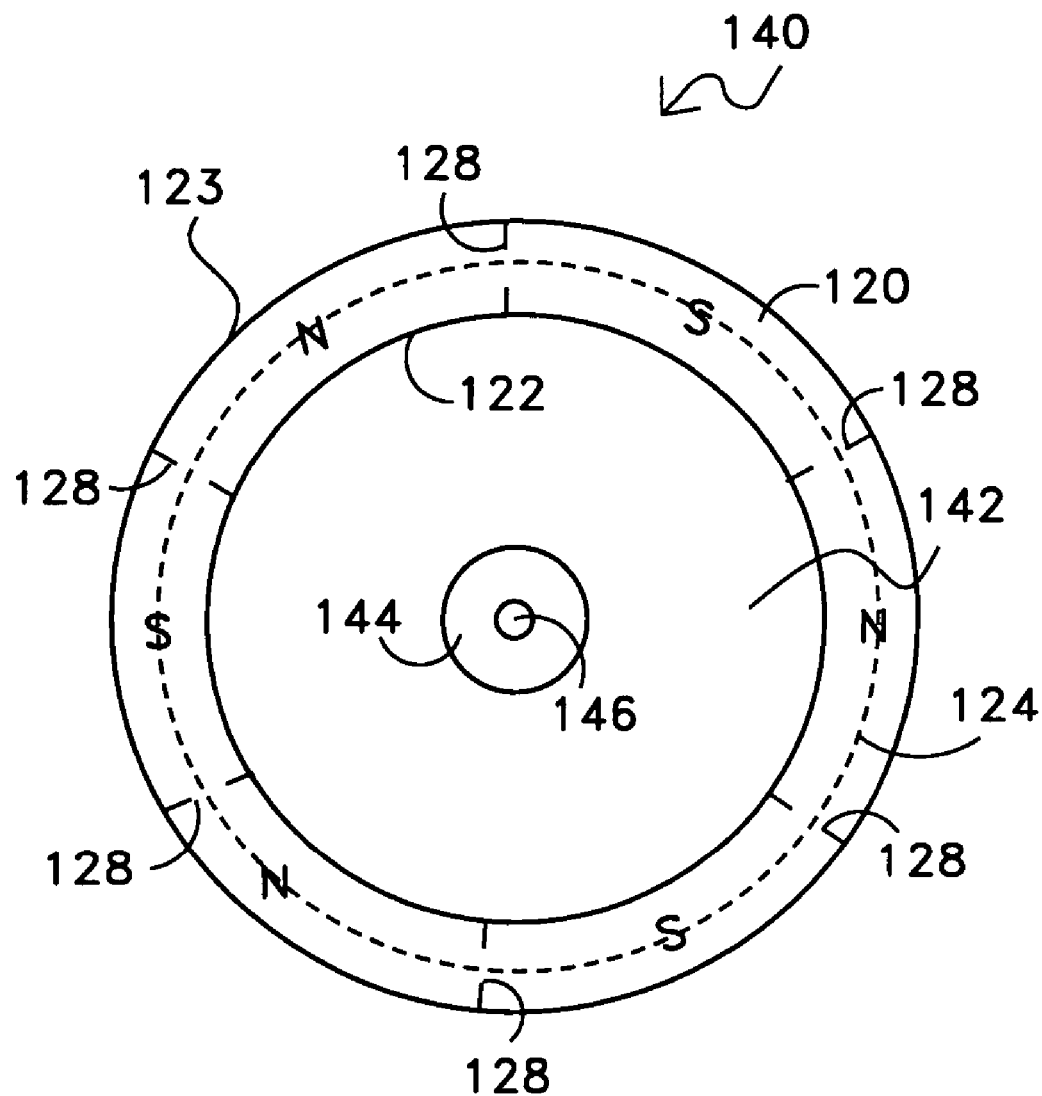
FIG. 1C is a simplified view of a magnet assembly according to one embodiment of the disclosed systems and methods.

FIG. 1C illustrates one exemplary embodiment of a magnet assembly 140 that includes a single one-piece permanent magnet 120 having a continuous ring shape that is coupled to a magnetic flux path return mechanism configured in the form of magnet base plate 142 for this embodiment. As shown, magnet base plate 142 is provided with a spindle member 146 rotatably coupled to hub 144 disposed in the center of magnet base plate 142. In this exemplary embodiment, magnet 120 has an inner periphery 122 and outer periphery 123, with the centerline of the magnet ring being indicated by broken line 124. For purposes of illustration, the single one-piece continuous magnet of FIG. 1C includes three sets of poles, with each set of poles including one north and one south pole shown separated from adjacent sets of poles by respective pole boundaries 128. Although a single one-piece continuous magnet having three sets of poles is illustrated in FIG. 1C, it will be understood that in other embodiments of the disclosed systems and methods, a stationary magnet assembly having a single one-piece continuous magnet with two or more sets of poles (including more than three sets of poles) may be employed in combination with a moving coil assembly having two or more moving coils.

Still referring to FIG. 1C, magnet base plate 142 may be of any material suitable for providing a magnetic flux return path from magnet 120 to motor coils 102 of an assembled servo mechanism. In one embodiment magnet base plate 142 may be a soft magnetic material such as low carbon steel, or may be any other type of magnetic material including, but not limited to, magnetic powder metal, magnetic stainless steel, etc. Hub 144 may be any mechanism and/or material suitable for supporting rotating spindle member 146 and its associated rotating components, such as ball bearing assembly, metallic or non-metallic bushing, etc. Spindle member 146 may be of any configuration suitable for being received in a complementary central opening 106 defined in a coil assembly 100. Although magnet 120 is illustrated coupled to a solid circular magnet base plate 142, it will be understood that any alternative configuration may be employed that is suitable for maintaining coil and magnet components of servo mechanism in operative relationship and for providing a magnetic flux return path from magnet 120 to motor coils 102, e.g., donut-shaped, etc.

Figure 1D:
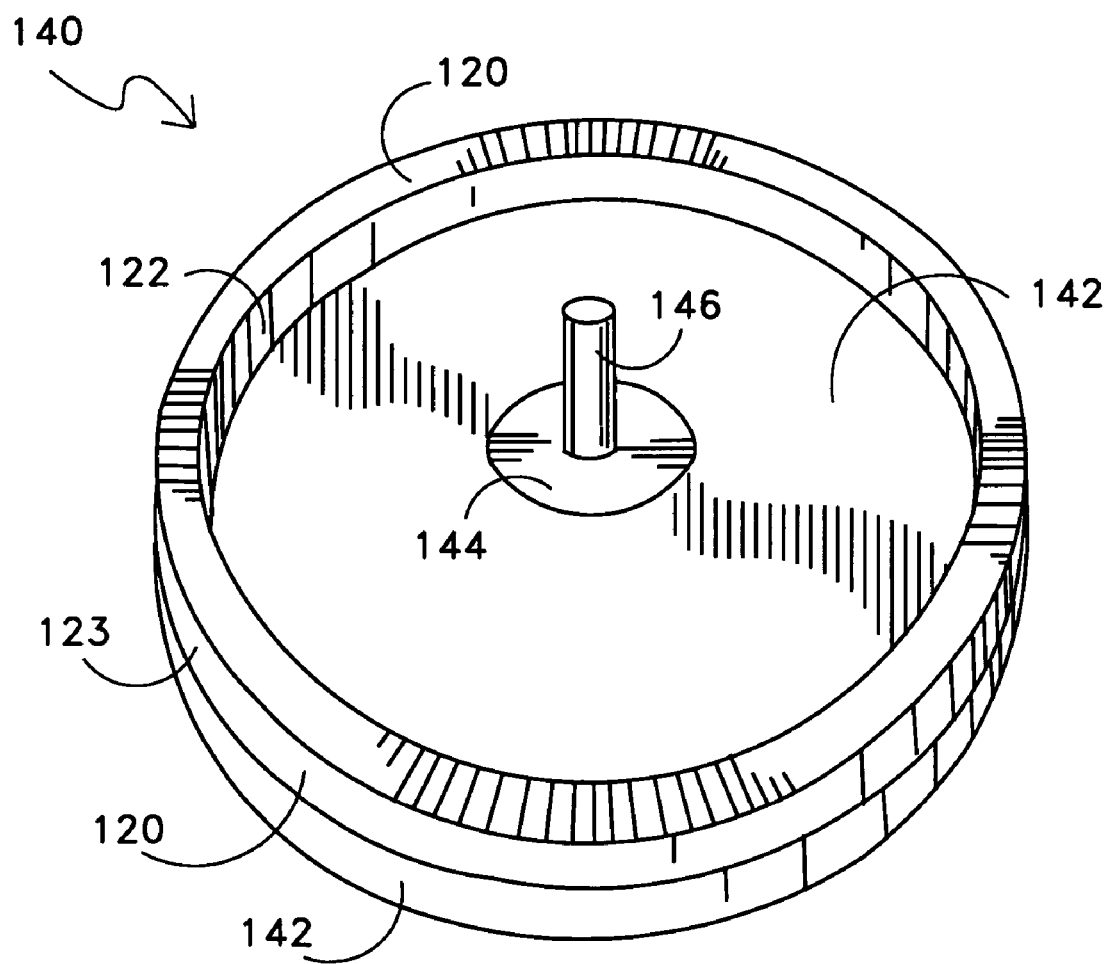
FIG. 1D is a simplified perspective view of a magnet assembly according to one embodiment of the disclosed systems and methods.

FIG. 1D illustrates a perspective view of a magnet assembly 140 including continuous ring-shaped magnet 120 and magnet base plate 142. Also shown in FIG. 1D is hub 144, and spindle member 146 that is configured for being received by central opening 106 of coil assembly 100.

As previously described, advantages that may be achieved by using a continuous ring permanent magnet (e.g., as opposed to multiple separate magnets configured in a non-continuous manner) in the disclosed electromagnetic circuit and servo mechanism include, but are not limited to, a reduction in torque ripple due to coil-to-coil phase transition, and reduction in manufacturing costs associated with the handling and assembly of the magnets due to eliminating the multiple poles associated with multi-magnet designs. By further configuring a continuous magnet with multiple sets of poles, additional advantages may be realized including, but not limited to, position sensing and low ripple back electromotive force generation. In this regard the number of sets of poles may be selected as desired to meet the needs or requirements of a given servo mechanism application.

In the practice of the disclosed apparatus and methods, a magnet assembly may be composed of any magnetic material that is suitable for achieving one or more of the features of the electromagnetic circuit and servo mechanism embodiments described elsewhere herein. Examples of suitable magnetic materials include, but are not limited to, non-ceramic (e.g., non-aluminum nickel cobalt or non-"alnico") magnet materials such as rare earth magnetic materials. In one embodiment, magnetic materials (e.g., rare earth magnetic materials) having a coercivity value of greater than or equal to about 3000 gauss may be employed for high speed applications, although other types of magnetic materials (e.g., including ceramic magnetic materials such as alnico magnetic materials) and magnetic materials having lesser coercivity values may be employed where suitable for achieving results or for meeting the needs of a given application or embodiment such as described elsewhere herein. Specific examples of suitable magnetic materials include, but are not limited to, materials comprising neodymium iron boron, samarium cobalt, combinations, thereof, etc. In one exemplary embodiment, a ring-shaped one-piece neodymium iron boron magnet may be cast and magnetized (e.g., magnetized to have three sets of poles in the manner indicated by the "N" and "S" symbols in FIGS. 1C and 1E) by Dexter Magnetic Technologies of Elk Grove Village, Ill.

Figure 1E:
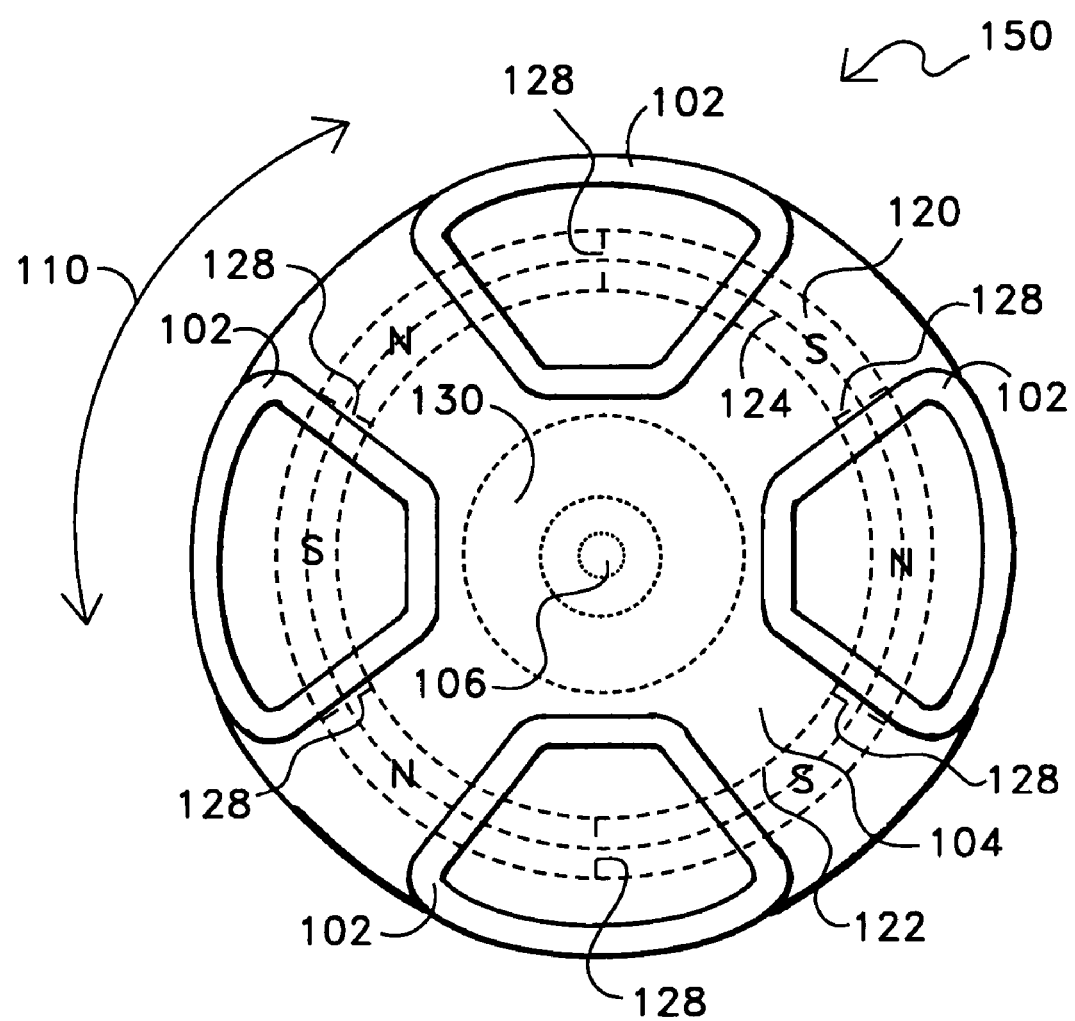
FIG. 1E is a simplified view of a servo mechanism according to one embodiment of the disclosed systems and methods.

FIG. 1E illustrates one exemplary embodiment of a servo mechanism 150 that includes a moving coil assembly 100 of FIG. 1A operatively positioned over an underlying stationary magnet assembly 140 of FIG. 1C. In the exemplary embodiment of FIG. 1E, spindle member 146 of magnet assembly 140 is received in central opening 106 of coil assembly 100 so that the motor coils 102 of coil assembly 100 are free to rotate through a range of 360 degrees relative to the stationary ring of continuous permanent magnet 120 of magnet assembly 140 in the plane and directions indicated by arrow 110. To ensure that movement of a moving coil assembly may be initiated from any stationary position relative to a stationary magnet assembly of the same servo mechanism, the servo mechanism may be configured with a moving coil assembly and stationary magnet assembly that are configured with respect to each other so that at least one moving coil is always positioned over a South pole of one pole set and so that the opposite leg of the same coil is simultaneously positioned over a North pole of an adjacent and different pole set. For example, as illustrated in FIG. 1E, motor coils 102 and pole boundaries 128 are relationally configured so that in all positions of moving coil assembly 100 relative to stationary magnet assembly 140, each of at least two of motor coils 102 are positioned across (e.g., straddling) a pole boundary 128, i.e., so that one leg of the coil 102 is positioned over a South pole of one pole set and the opposite leg of the same coil 102 is positioned over a North pole of an adjacent and different pole set.

Figure 1F:
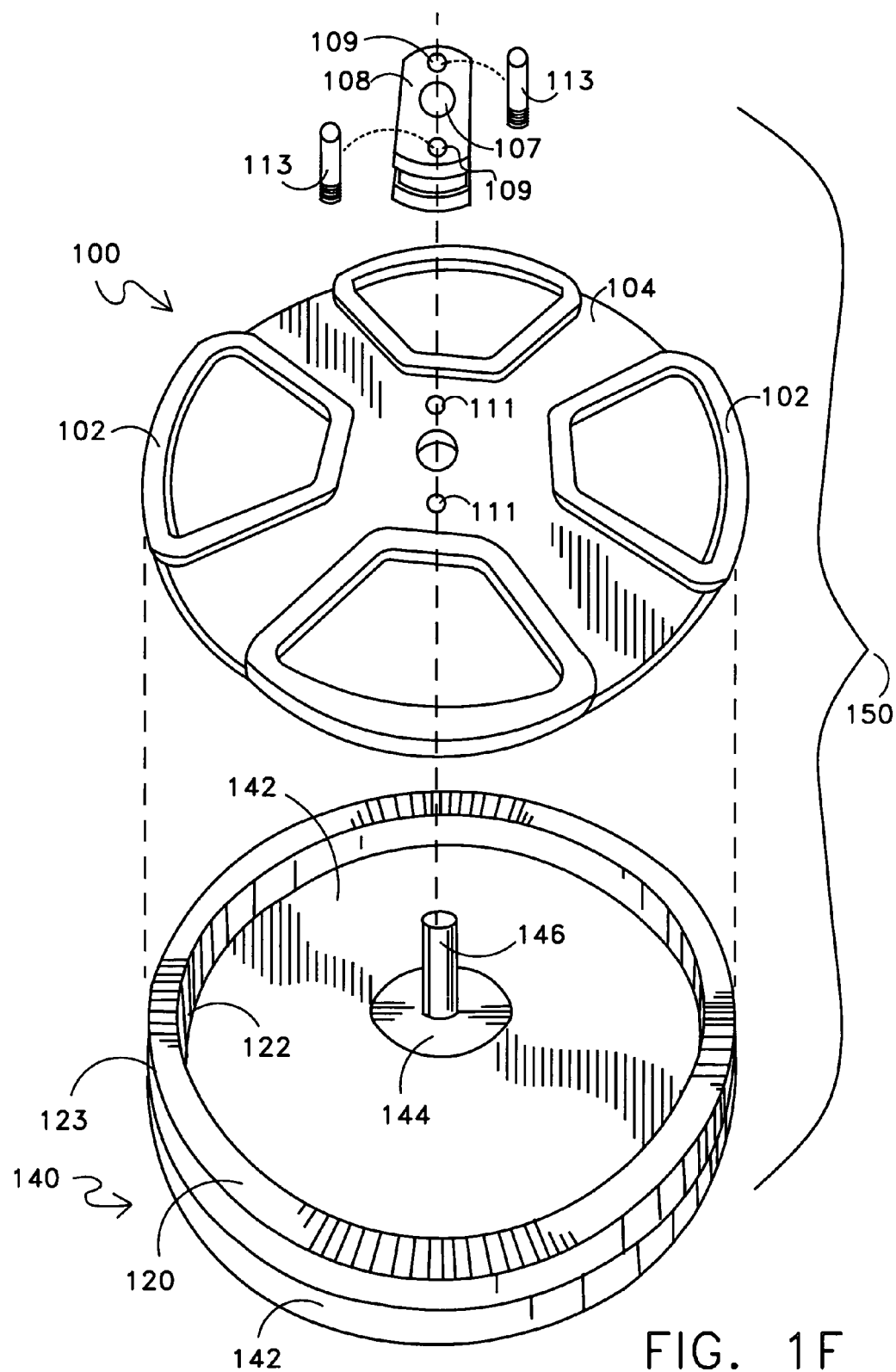
FIG. 1F is a simplified exploded perspective view of a servo mechanism according to one embodiment of the disclosed systems and methods.
Figure 1G:
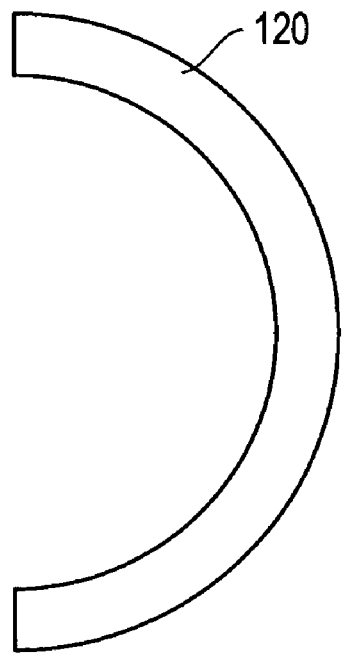
FIG. 1G is a simplified view of a magnet configured in a half ring shape according to one embodiment of the disclosed systems and methods.
Figure 1H:
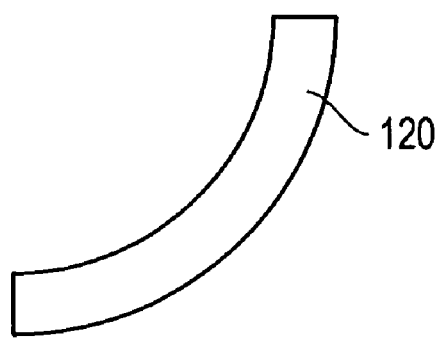
FIG. 1H is a simplified view of a magnet configured in a quarter ring shape according to one embodiment of the disclosed systems and methods.

FIG. 1F illustrates a perspective view of exemplary servo mechanism 150 including moving coil assembly 100 in operative relationship with stationary coil assembly 140. Also shown is drive bracket 108 having fastener holes 109 for receiving fasteners 113 that may be employed to fixedly couple drive bracket 108 to coil support platter 104.

Figure 2A:
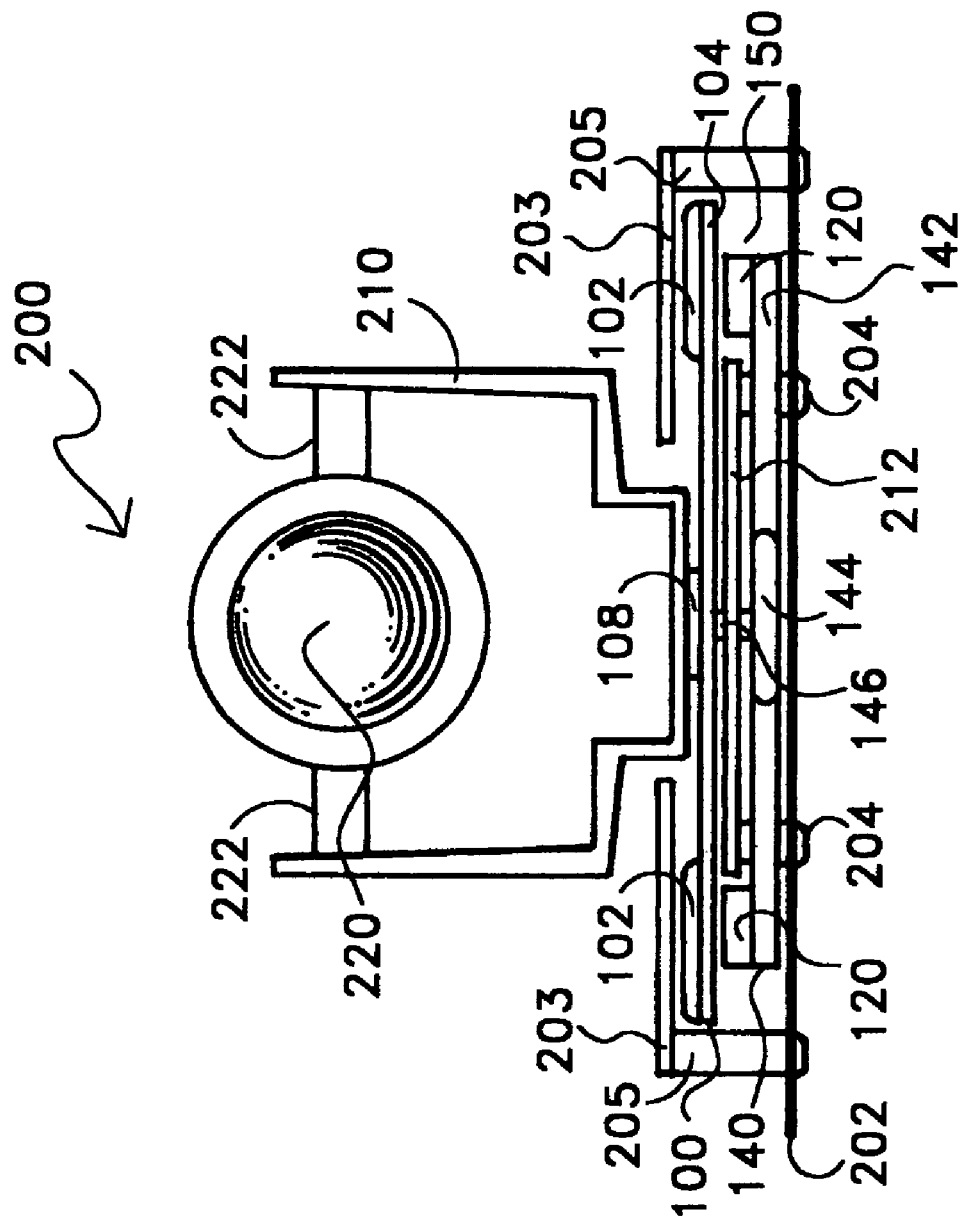
FIG. 2A is a simplified cross sectional schematic view of a stack-up assembly according to one embodiment of the disclosed systems and methods.

FIG. 2A illustrates one exemplary embodiment of an optical block and servo mechanism stack-up assembly 200 that includes a servo mechanism stack up assembly 150 rotatably coupled to an optical block assembly 220, e.g., to provide rotation to optical block assembly 220 in the pan axis direction. As shown, servo mechanism 150 includes a moving coil assembly 100 assembled in operative relationship with a stationary magnet assembly 140. Moving coil assembly 100 includes motor coils 102 that are integrated/fixedly coupled to coil support platter 104, and stationary magnet assembly 140 includes a single permanent magnet 120 having a continuous ring shape and fixedly coupled to magnet base plate 142 in a manner as previously described. In the illustrated embodiment, stationary magnet assembly 140 is fixedly coupled to servo mechanism base 202 by mounting posts 204. Servo mechanism base 202 may be, for example, the base of a servo mechanism housing. However, in the practice of the disclosed systems and methods, a stationary magnet may be fixedly coupled to any other type of suitable base member or stationary mounting surface, or may be mounted to a surface via brackets or by any other suitable mechanism or method. Also shown in FIG. 2A is an optional servo mechanism housing cover 203 that may be coupled to servo mechanism base 204 around servo mechanism 150 by servo mechanism housing side/s 150.

As may be seen in FIG. 2A the relatively flat configuration of coils 102 and coil support platter 104 of moving coil assembly 100, and the relatively flat configuration of continuous ring-shaped magnet 120 and magnet base plate 142 of stationary magnet assembly 140 together provide a servo mechanism stack up assembly 150 having a minimized stack height and relatively low profile. In one exemplary embodiment, such a servo mechanism stack up assembly having a minimized stack height and relatively low profile may be implemented that advantageously combines the features of slip ring, position feedback sensor, and moving coil assembly in one stack up assembly as will be described in further detail below.

Still referring to FIG. 2A, moving coil assembly 100 is shown rotatably coupled to stationary magnet assembly 140 by spindle member 146 and hub 144 in a manner as described previously. Coil support platter of moving coil assembly 100 is fixedly coupled to drive bracket 108, which is in turn fixedly coupled to yoke assembly 210 that supports and suspends an optical block assembly 220 via optical block mounting members 222 as shown. In this embodiment, moving coil assembly 100 moves with yoke 210 while magnet assembly 140 remains stationary. Optical block mounting members 222 may fixedly couple optical block 220 to yoke assembly 210, or alternatively may rotatably couple optical block 220 to yoke assembly 210 (e.g., mounting members 222 may be a rotatable shaft of a drive motor or drive gearbox) to provide rotation to optical block 220 in the tilt axis direction. In one embodiment, a servo mechanism implemented according to the disclosed systems and methods may be provided to impart rotation to optical block 220 in the tilt axis direction, e.g., a servo mechanism fixedly coupled to yoke 210 and rotatably coupled to optical block mounting members 222. In such an embodiment, a tilt servo mechanism may be provided that includes a stationary magnet assembly having a continuous magnet with at least two sets of poles in combination with a moving coil assembly having at least one motor coil. The continuous magnet may be in the shape or a partial ring, for example, a quarter ring so as to provide 90 degrees of rotation to optical block 220. Alternatively, a conventional electric motor and/or gear box mechanism may be provided to impart rotation to optical block 220 in the tilt axis direction.

Optical block assembly 220 may be any type of suitable optical block including, but not limited to, CCTV camera optical block, motion picture or studio television camera optical block, camcorder optical block, military targeting device optical block, imaging device optical bock, etc. Examples of suitable optical blocks that may be employed as optical block assembly 220 in the practice of the disclosed systems and methods include linear or folded optical blocks such as described and illustrated in concurrently filed U.S. patent application Ser. No. 10/732,193, entitled "OPTICAL BLOCK ASSEMBLY" by Hovanky et al., and in concurrently filed U.S. patent application Ser. No. 10/732,740, entitled "SYSTEMS AND METHODS FOR ACTUATiNG LENS ASSEMBLIES" by Hovanky, each of which are incorporated herein by reference.

In one exemplary embodiment, the optical block and servo mechanism stack-up assembly 200 of FIG. 2A may be dimensionally configured to have a minimized stack height and relatively low profile for a CCTV camera implementation. In this exemplary embodiment, a stack height measured from top surface of servo mechanism base 202 to bottom (mounting) surface of yoke 210 may be configured that is from about 0.75" to about 1", alternatively about 0.75", although greater or lesser stack height dimensions are also possible. This is compared to a stack height for conventional slip ring assemblies that are typically from about 1.75" to about 2.5". It will be understood that stack height may vary depending on the needs or requirements of a given application. For example, a thicker magnet 120 may be employed to provide more torque for handling larger loads. In one exemplary embodiment, outer diameter of moving coil assembly 100 and stationary magnet assembly 140 may each independently vary from about 2" to about 4.5" in any manner suitable for allowing motor coils 102 and magnet 120 to interact in a manner as described elsewhere herein, although greater and lesser outer diameters may be employed in other embodiments.

The following exemplary dimensions are provided to further illustrate how various combinations of the components of an optical block and servo mechanism stack-up assembly 200 may be dimensionally varied to minimize stack height and profile, e.g., for a CCTV camera application. PCB components of moving coil support platter 104 and optional stationary printed circuit board assembly 212 each may be of any available PCB thickness suitable for providing the features described herein. In one embodiment, PCB thickness for platter 104 and assembly 212 may each independently be from about 0.04" to about 0.062", alternatively about 0.062", although greater or lesser PCB thicknesses may also be suitably employed. Magnet 120 may have a thickness in one embodiment of from about 0.06" to about 0.15", alternatively about 0.08", although greater or lesser magnet thicknesses may also be suitably employed. In one embodiment, thickness of magnet base plate 142 may be configured to be about 20% greater than the thickness of magnet 120, or from about 0.08" to about 0.17", alternatively about 0.1", although greater or lesser base plate thicknesses may also be suitably employed. In one embodiment, motor coils 102 may have a thickness of from about 0.08" to about 0.14", alternatively about 0.1", although greater or lesser motor coil thicknesses may also be suitably employed. In one exemplary embodiment, the gap between moving coil assembly 100 and stationary magnet assembly 140 may be configured to be from about 0.03" to about 0.06", alternatively about 6.06", although greater or lesser gap thicknesses may be implemented.

Figure 2B:
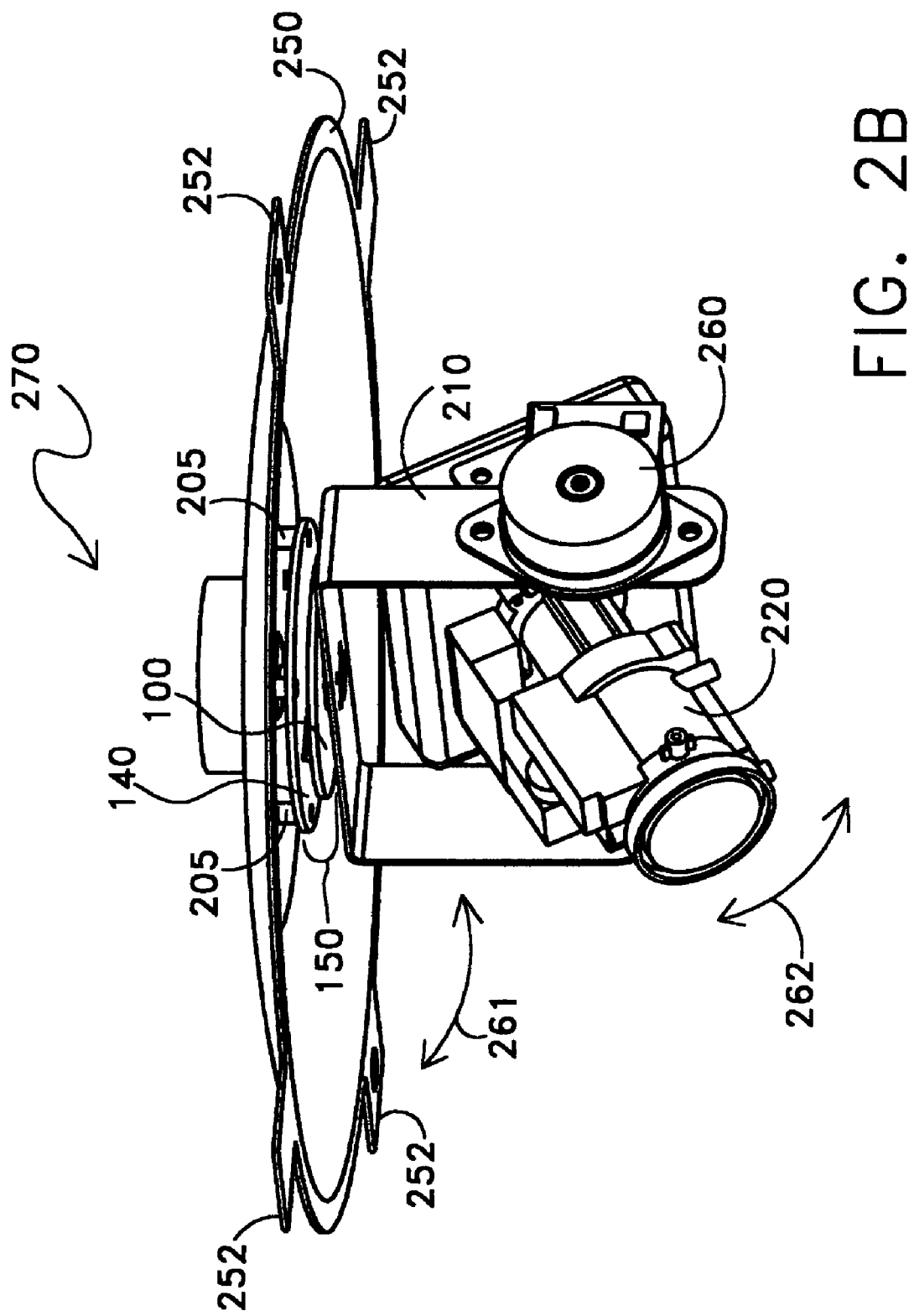
FIG. 2B is a perspective view of a stack-up assembly according to one embodiment of the disclosed systems and methods.

FIG. 2B illustrates one exemplary embodiment of an optical block and servo mechanism stack-up assembly as it may be implemented, for example, as a part of a pan-tilt-zoom ("PTZ") camera installation 270 (e.g., for CCTV surveillance of a room or other area). As illustrated in FIG. 2B, servo mechanism stack up assembly 150 includes stationary magnet assembly 140 coupled to a mounting base support structure 250 (e.g., for mounting to suitable surface such as wall or ceiling by mounting flanges 252). Servo mechanism stack up assembly 150 also includes moving coil assembly 100 rotatably coupled between stationary magnet assembly 140 and optical block assembly 220, e.g., to provide rotation to optical block assembly 220 in the pan axis direction indicated by arrow 261. Optical block assembly 220 may be provided with zoom and focus lens group assemblies. A yoke-mounted actuator 260 (e.g., voice coil servo mechanism or other type of suitable motor or servo mechanism) is shown coupled to yoke assembly 210 and optical block assembly 220, e.g., as a tilt actuator to provide rotation to optical block assembly 220 in the tilt axis direction indicated by arrow 262. Not shown is optional camera assembly enclosure (e.g., transparent semispherical dome or other suitable enclosure configuration) that may be provided to couple to mounting base 250 in a manner so as to enclose the components of camera installation 270.

As previously mentioned, a coil support platter 104 may be a printed circuit board that optionally may include circuitry related to the operation of the optical block and/or servo mechanism, e.g., image processing circuitry for optical block 220 and/or servo mechanism operational circuitry for controlling servo mechanism 150, for sensing position of servo mechanism 150, etc. Referring again to FIG. 2A, one such exemplary embodiment may be implemented by providing an optional stationary printed circuit board assembly 212 that is fixedly coupled to servo mechanism base 202 and stationary magnet assembly 140 by mounting posts 204 as shown. In this embodiment, stationary PCB assembly 212 may be provided with servo mechanism and/or optical block circuitry that is configured to interface with complementary circuitry contained on a PCB of moving coil support platter 104, e.g., in the manner of a slip ring interface that advantageously allows unrestricted 360 degree range of rotation while signals are transmitted between moving coil assembly 100 and stationary magnet assembly 140.

Still referring to FIG. 2A, a dynamic signal interface may be created between the top side of stationary PCB assembly 212 and the under side of moving coil support platter 104 by providing appropriate mating dynamic interface components on each assembly and by electrically coupling the same, e.g., by providing radially concentric conductive traces on the top side surface of stationary PCB assembly 212 and mating conductive brushes or leaf springs on the under side surface of PCB 104 (or vice-versa) that contact each other to conduct electronic signals while the PCB of coil support platter 104 rotates relative to stationary PCB assembly 212, by providing capacitive sensor components on the top side surface of stationary PCB assembly 212 and mating capacitive sensor components on the under side surface of PCB 102 (or vice-versa) that do not contact but move in proximity to each other to conduct electronic signals while the PCB of coil support platter 104 rotates relative to stationary PCB assembly 212, etc. Further information on exemplary PCB slip ring mechanisms that may be employed in the practice of the disclosed systems and methods include those described and illustrated in concurrently filed U.S. patent application Ser. No. 10/732,924, entitled "SLIP RING APPARATUS" by Washington et al., which is incorporated herein by reference.

Figure 3:
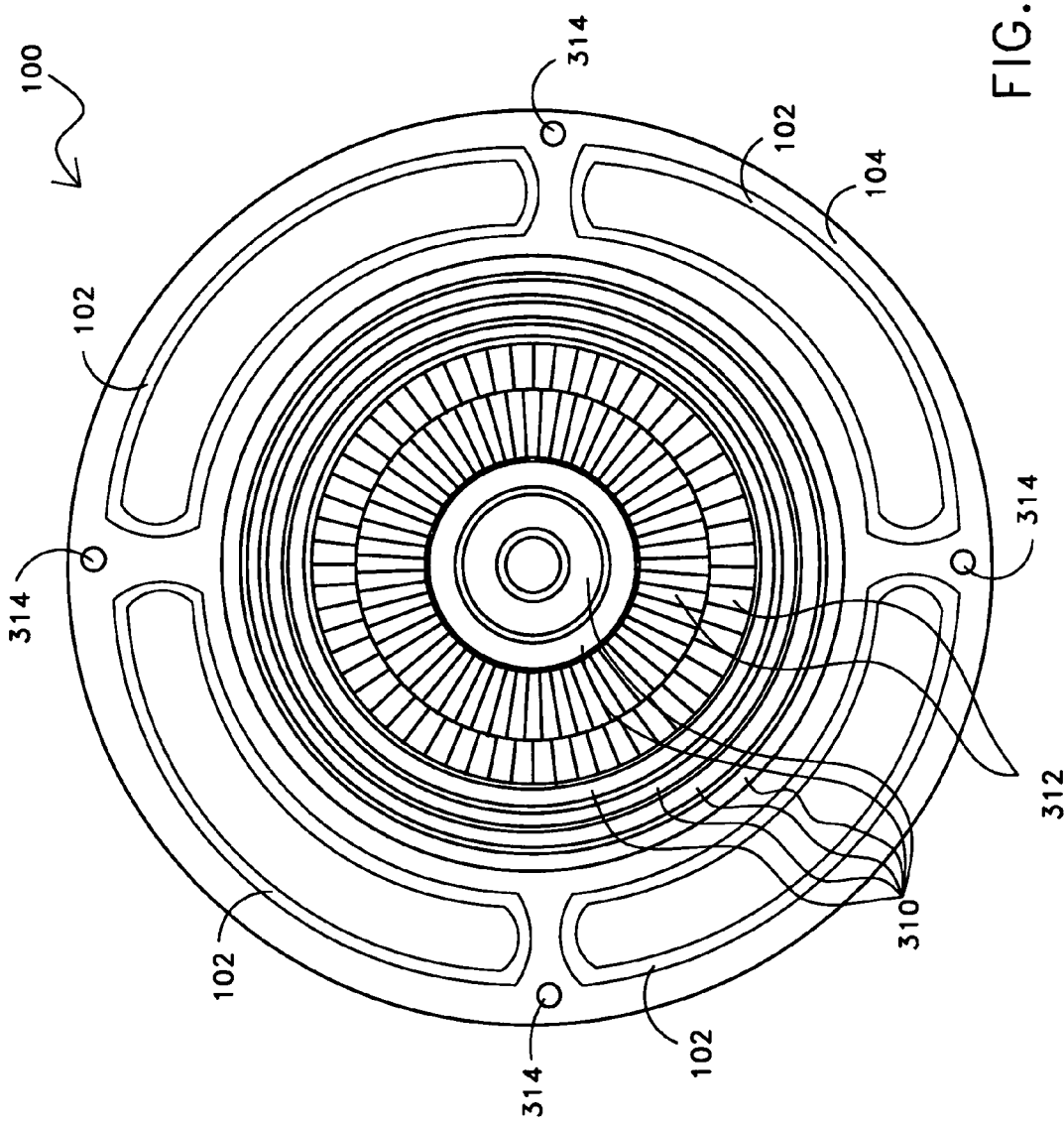
FIG. 3 is a simplified view of a moving coil assembly according to one embodiment of the disclosed systems and methods.
Figure 4:
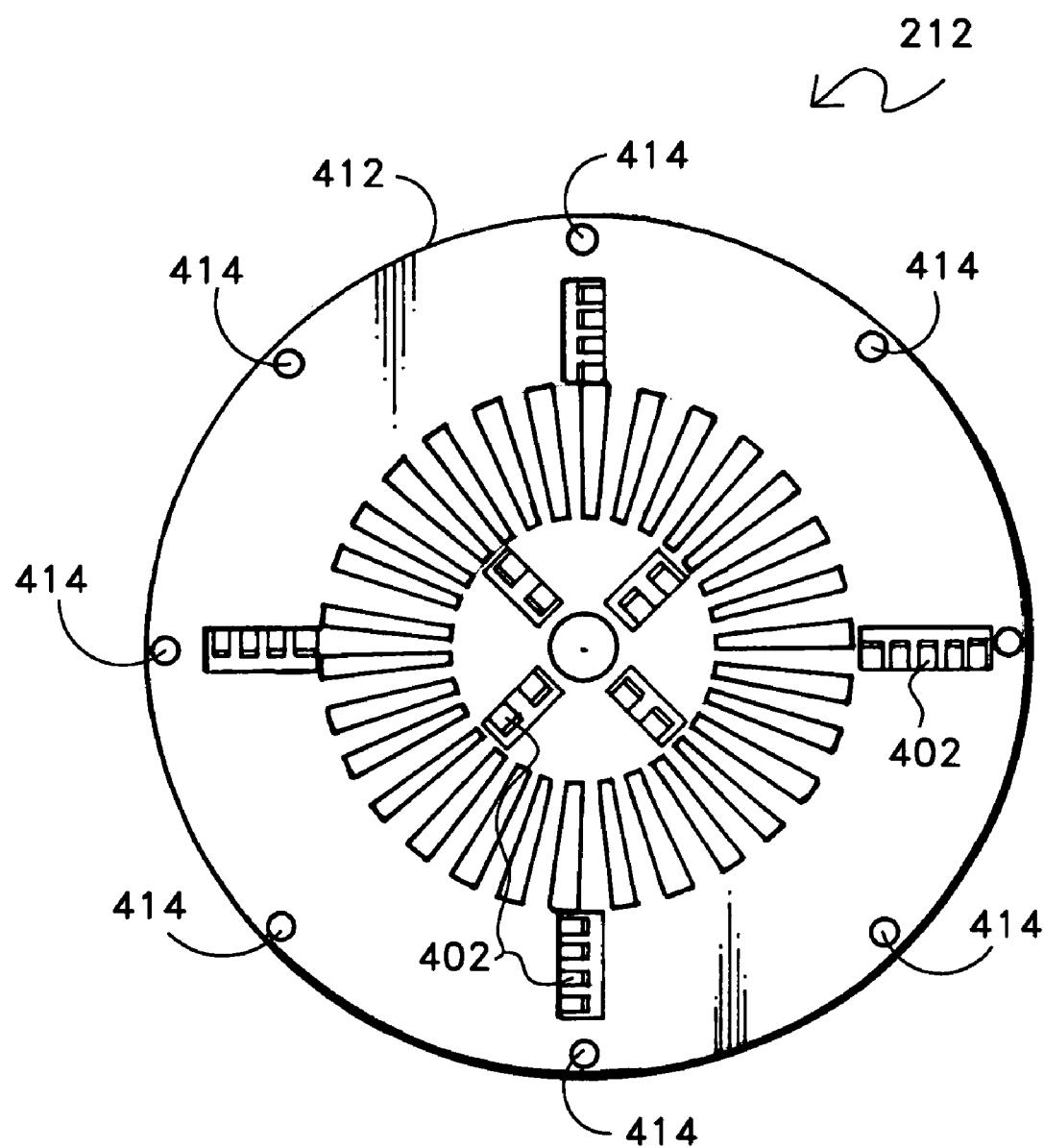
FIG. 4 is a simplified view of a stationary PCB assembly according to one embodiment of the disclosed systems and methods.

FIGS. 3 and 4 illustrate one exemplary embodiment of respective moving coil assembly 104 and mating stationary PCB assembly 212 that are configured as slip ring components with integrated circuitry for providing signal processing, e.g., such as position feedback circuitry, drive or signal conditioning circuitry, etc. As shown in FIG. 3, one exemplary embodiment of the disclosed systems and methods may employ a moving coil assembly 100 that is configured with a moving coil support platter 104 having integrated slip ring traces 310 and embedded capacitive sensor components in the form of radially-extending spaced conductive segments 312 that are operatively disposed on platter 104 in a position inboard of integrated motor coils 102. As shown, mounting holes 314 may be defined in the outer periphery of moving coil support platter 104 for the purpose of supporting the coil assembly in a moving magnet/stationary coil configuration embodiment.

FIG. 4 illustrates stationary PCB assembly 212 having integrated brushes or leaf springs 402 for conductively and rotatably mating with traces 310 of moving coil assembly 104. In assembled configuration, brushes 402 and traces 310 form a slip ring mechanism that may be used to transmit power and/or data between stationary PCB assembly 212 and moving coil assembly 104 while simultaneously allowing unrestrained and continuous rotation of moving coil assembly 104 to occur. As shown, mounting holes 414 may be defined in the outer periphery of moving coil support platter 104 for the purpose of fixedly mounting PCB assembly 212 to magnet base 142 using mounting posts 204.

As further illustrated in FIG. 4, stationary PCB assembly 212 may be provided with one or more embedded capacitive sensor components in the form of spaced conductive segments 412 that are configured for facing and rotatably interacting with conductive segments 312 of moving coil assembly 100. Together, the conductive segments 312 and 412 form a position feedback unit. Using this configuration, an alternating electrical signal may be applied to either the rotor element 100 or stator element 212, and resulting effects (e.g., capacitive, hall effect, and/or magneto-resistive effects) may be sensed from the opposite element. It will be understood that the circuitry illustrated and described herein is exemplary only and that any other type of circuitry may be operatively employed in the practice of the disclosed systems and methods, e.g., such as describe in concurrently filed U.S. patent application Ser. No. 10/732,924, entitled "SLIP RING APPARATUS" by Washington et al., which has been incorporated herein by reference.

It will be understood that FIGS. 2–4 illustrate one exemplary embodiment of a servo mechanism configured with integrated PCB slip ring capability (i.e., moving coil support platter 104 with integrated circuitry and slip ring for dynamically interfacing with stationary PCB assembly 212) that is implemented with a multiple coil/single magnet configuration. In this regard, integrated PCB slip ring capability may be implemented with any other suitable combination of coil assembly and magnet assembly where suitable for a given application including, but not limited to, coil assembly having a single coil in combination with magnet assembly having multiple magnets, coil assembly having multiple coils in combination with magnet assembly having multiple magnets, etc. Furthermore, it will be understood that a servo mechanism may be implemented with any other configuration of slip ring interface or non-slip ring interface suitable for transmitting signals between stationary and moving components coupled to a servo mechanism, e.g., such as camera systems. Alternatively, the disclosed systems and methods may be implemented to actuate or move devices that do not require signals to be transmitted between stationary and moving components coupled to a servo mechanism, e.g., such as material handling equipment.

It will also be understood that a magnet assembly having a continuous magnet (e.g., one-piece continuous magnet) may be alternatively implemented as a moving component in a servo mechanism. In this regard, a servo mechanism may employ a stationary coil assembly in combination with a moving magnet assembly, or a servo mechanism may employ a moving coil assembly in combination with a moving magnet assembly (e.g., in an application where it is only desired that the coil assembly and magnet assembly move relative to each other without the necessity of holding either assembly stationary). Implementation of one such alternate embodiment may be realized by, for example, by coupling a drive bracket and associated equipment (e.g., yoke, optical block, etc.) so that the drive bracket and associated equipment rotate with a moving magnet assembly that itself is rotatably coupled to a stationary coil assembly which is fixedly coupled to a stationary surface. In embodiments where both coil and magnet assemblies are configured as movable components, a drive bracket and associated equipment may be mounted to either of the moving coil assembly and moving magnet assembly, or alternatively a separate drive bracket and associated equipment may be mounted to each of the moving coil assembly and the moving magnet assembly (e.g., where it is desired to rotatably drive two pieces of equipment relative to each other).

Furthermore, although described and illustrated with respect to use as pan and tilt motors of articulated cameras, it will be understood that the disclosed electromagnetic circuit and servo mechanism may be implemented as an actuator in a variety of different motor or actuator applications including, but not limited to, use as head-actuators of magnetic and optical drives. Examples of other suitable application environments for the disclosed apparatus include, but are not limited to, those applications described in U.S. Pat. No. 5,122,702, which is incorporated herein by reference.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus, systems and methods may be utilized in various combinations and/or independently. Thus the invention is not limited to only those combinations shown herein, but rather may include other combinations.

REFERENCES

The following references, to the extent that they provide exemplary system, apparatus, method, or other details supplementary to those set forth herein, are specifically incorporated herein by reference.

U.S. Provisional patent application Ser. No. 60/437,713 entitled "Systems And Methods For Location Of Objects", by Richard G. Washington.

Concurrently filed U.S. patent application Ser. No. 10/732,174 entitled "Systems And Methods For Location Of Objects", by Richard G. Washington.

U.S. Provisional patent application Ser. No. 60/437,710 entitled "Systems And Methods For Actuating Lens Assemblies", by Thao D. Hovanky.

Concurrently filed U.S. patent application Ser. No. 10/732,740 entitled "Systems And Methods For Actuating Lens Assemblies", by Thao D. Hovanky.

U.S. Provisional patent application Ser. No. 60/437,712 entitled "Slip Ring Apparatus", by Richard G. Washington and Thao D. Hovanky.

Concurrently filed U.S. patent application Ser. No. 10/732,924 entitled "Slip Ring Apparatus", by Richard G. Washington and Thao D. Hovanky.

U.S. Provisional patent application Ser. No. 60/437,690 entitled "Optical Block Assembly", by Thao D. Hovanky and Richard C. Washington.

Concurrently filed U.S. patent application Ser. No. 10/732,193 entitled "Optical Block Assembly", by Thao D. Hovanky and Richard G. Washington.

U.S. Provisional patent application Ser. No. 60/437,709 entitled "Thermoelectric Cooled Imaging Apparatus", by Richard G. Washington and Thao D. Hovanky.

Concurrently filed U.S. patent application Ser. No. 10/732,192 entitled "Thermally Cooled Imaging Apparatus", by Richard G. Washington and Thao D. Hovanky.

U.S. Provisional patent application Ser. No. 60/456,294 entitled "Systems And Methods For Creation, Transmission, And Viewing Of Multi-Resolution Video", by Richard C. Washington.

What is claimed is:

1. A servo mechanism, comprising:
    a coil assembly, said coil assembly comprising at least one motor coil integrated with a printed circuit board; and
    a magnet assembly, said magnet assembly comprising a one-piece continuous rare earth magnet having at least two sets of poles and being configured in a full ring shape;
    wherein said coil assembly and said magnet assembly are rotatably coupled together in operative relationship;
    wherein said coil assembly further comprises a coil support platter rotatably coupled to said magnet assembly, said at least one coil being fixedly coupled to said coil support platter;
    wherein said coil support platter comprises a first printed circuit board having first circuitry;
    wherein said magnet assembly further comprises a second printed circuit board having second circuitry, said second printed circuit board being fixedly coupled to said magnet;
    wherein said servo mechanism further comprises a dynamic signal interface between said first circuitry of said first printed circuit board and said second circuitry of said second printed circuit board;
    wherein said first printed circuit board and said second printed circuit board define a slip ring boundary therebetween; and
    wherein said first and second circuitry comprise position feedback circuitry.

2. The servo mechanism of claim 1, wherein said first and second circuitry further comprises servo mechanism operational circuitry.

3. The servo mechanism of claim 1, wherein a magnetic flux path return mechanism of said magnet assembly comprises a magnet base plate fixedly coupled to said one-piece continuous magnet so that said one-piece continuous magnet is disposed between said magnet base plate and said coil assembly.

4. The servo mechanism of claim 1, wherein said coil assembly is a moving coil assembly and wherein said magnet assembly is a stationary magnet assembly.

5. The servo mechanism of claim 1, wherein said coil assembly is a stationary coil assembly and wherein said magnet assembly is a moving magnet assembly.

6. The servo mechanism of claim 1, wherein one of said coil assembly or said magnet assembly is configured to be coupled to an optical block so as to directly drive and impart rotation to said optical block.

7. The servo mechanism of claim 6, wherein said optical block comprises a closed circuit television camera optical block.

8. The servo mechanism of claim 1, wherein said one-piece continuous rare earth magnet comprises a neodymium iron boron magnet or a samarium cobalt magnet.

9. The servo mechanism of claim 8, wherein said one-piece continuous rare earth magnet comprises a neodymium iron boron magnet.

10. The servo mechanism of claim 1, wherein said one-piece continuous rare earth magnet is cast in a full ring shape.

11. A servo mechanism, comprising:
    a coil assembly, said coil assembly comprising at least one motor coil having coil conductor terminals, said at least one motor coil being integrated with a printed circuit board and first circuitry; and
    a magnet assembly, said magnet assembly comprising second circuitry and a one-piece continuous rare earth magnet having at least two sets of poles and being configured in a full ring shape;
    wherein said coil assembly and said magnet assembly are rotatably coupled together so that at least one of said coil assembly and said magnet assembly rotates in response to application of voltage across said coil conductor terminals of said at least one coil; and
    wherein said first and second circuitry comprise position feedback circuitry.

12. The servo mechanism of claim 11, where said coil assembly comprises a plurality of motor coils, said plurality of motor coils being oriented in a configuration so that at least one of said motor coils is positioned across a pole boundary between individual poles of at least one of said at least two sets of poles in all relative rotational positions of said coil assembly and said magnet assembly.

13. The servo mechanism of claim 11, wherein said coil assembly is a moving coil assembly that rotates in response to application of voltage across said coil conductor terminals of said at least one coil; and wherein said magnet assembly is a stationary magnet assembly.

14. The servo mechanism of claim 13, wherein said moving coil assembly further comprises a first printed circuit board rotatably coupled to said stationary magnet assembly, said at least one coil being fixedly coupled to said first printed circuit board, and said first printed circuit board comprising first circuitry; wherein said stationary magnet assembly further comprises a second printed circuit board fixedly coupled to said magnet, said second printed circuit board having second circuitry; and wherein said servo mechanism further comprises a dynamic signal interface between said first circuitry of said first printed circuit board and said second circuitry of said second printed circuit board.

15. The servo mechanism of claim 14, wherein said first and second circuitry comprise servo mechanism operational circuitry.

16. The servo mechanism of claim 15, wherein a magnetic flux path return mechanism of said stationary magnet assembly comprises a magnet base plate fixedly coupled to said one-piece continuous magnet so that said one-piece continuous magnet is disposed between said magnet base plate and said moving coil assembly.

17. The servo mechanism of claim 13, wherein said moving coil assembly is configured to be coupled to directly drive an optical block so that said optical block is rotatable with said moving coil assembly relative to said stationary magnet assembly.

18. The servo mechanism of claim 17, wherein said optical block comprises a closed circuit television camera optical block.

19. The servo mechanism of claim 17, wherein said moving coil assembly is configured to be coupled to said optical block so as to impart rotation to said optical block in a pan axis direction.

20. The servo mechanism of claim 17, wherein said moving coil assembly is configured to be coupled to said optical block so as to impart rotation to said optical block in a tilt axis direction.

21. The servo mechanism of claim 11, wherein said one-piece continuous rare earth magnet comprises a neodymium iron boron magnet or a samarium cobalt magnet.

22. The servo mechanism of claim 21, wherein said one-piece continuous rare earth magnet comprises a neodymium iron boron magnet.

23. The servo mechanism of claim 11, wherein said one-piece continuous rare earth magnet is cast in a full ring shape.

24. A rotary drive optical block assembly, comprising:
a coil assembly, said coil assembly comprising:
at least one motor coil having coil conductor terminals, and
a coil support platter comprising a first printed circuit board having first circuitry and first dynamic interface components, said at least one coil being fixedly coupled to said coil support platter;
a magnet assembly rotatably coupled to said coil assembly so that one of said coil assembly or said magnet assembly is a moving assembly that rotates in response to application of voltage across said coil conductor terminals of said at least one coil, and the other of said coil assembly or said magnet assembly is a stationary assembly, said magnet assembly comprising:
a continuous magnet having at least two sets of poles, and
a second printed circuit board fixedly coupled to said magnet, said second printed circuit board having second circuitry and second dynamic interface components electrically coupled to said first dynamic interface components; and
an optical block coupled to said moving assembly, so that said moving assembly directly drives and imparts rotation to said optical block relative to said stationary assembly when said moving assembly rotates relative to said stationary assembly;
wherein said first dynamic interface components of said first printed circuit board and said second dynamic interface components of said second printed circuit board together form a dynamic signal interface between said first circuitry of said first printed circuit board and said second circuitry of said second printed circuit board; and
wherein said first and second circuitry comprise position feedback circuitry.

25. The rotary drive optical block assembly of claim 24, wherein said continuous magnet comprises a one-piece rare earth magnet.

26. The rotary drive optical block assembly of claim 25, where said coil assembly comprises a plurality of motor coils, said plurality of motor coils being fixedly coupled to said coil support platter in a configuration so that at least one of said motor coils is positioned across a pole boundary between individual poles of at least one of said at least two sets of poles in all relative rotational positions of said moving assembly and said stationary assembly.

27. The rotary drive optical block assembly of claim 26, wherein said coil assembly is said moving assembly; and wherein said magnet assembly is said stationary assembly.

28. The rotary drive optical block assembly of claim 27, wherein a magnetic flux path return mechanism of said stationary magnet assembly comprises a magnet base plate fixedly coupled to said one-piece continuous magnet so that said one-piece continuous magnet is disposed between said magnet base plate and said moving coil assembly.

29. The rotary drive optical block assembly of claim 25, wherein said first and second circuitry comprise image processing circuitry, servo mechanism operational circuitry, or a combination thereof.

30. The rotary drive optical block assembly of claim 29, wherein said coil assembly is said moving assembly; and wherein said stationary assembly is said magnet assembly.

31. The rotary drive optical block assembly of claim 30, wherein said optical block comprises a closed circuit television camera optical block.

32. The rotary drive optical block assembly of claim 27, wherein said one-piece continuous magnet is configured in a full ring shape so that said moving coil assembly is rotatable through 360 degrees of rotation in response to application of voltage across said coil conductor terminals of said at least one coil of said coil assembly.

33. The rotary drive optical block assembly of claim 32, wherein said moving coil assembly is configured to impart rotation to said optical block in a pan axis direction.

34. The rotary drive optical block assembly of claim 27, wherein said one-piece continuous magnet is configured in a partial ring shape so that said moving coil assembly is rotatable through less than 360 degrees of rotation in response to application of voltage across said coil conductor terminals of said at least one coil of said coil assembly.

35. The rotary drive optical block assembly of claim 34, wherein said moving coil assembly is configured to impart rotation to said optical block in a tilt axis direction.

36. The rotary drive optical block assembly of claim 24, wherein said first printed circuit board and said second printed circuit board define a slip ring boundary therebetween; and wherein said first and second circuitry comprise position feedback circuitry.

37. A method of operating a servo mechanism, comprising:
providing a servo mechanism, comprising:
a coil assembly, said coil assembly comprising at least one motor coil having coil conductor terminals, said at least one motor coil being integrated with a printed circuit board and first circuitry, and
a magnet assembly, said magnet assembly comprising second circuitry and a one-piece continuous rare earth magnet having at least two sets of poles and being configured in a full ring shape,
wherein said coil assembly and said magnet assembly are rotatably coupled together in operative relationship,
wherein said first and second circuitry comprise position feedback circuitry; and
imparting rotation to at least one of said coil assembly or said magnet assembly by applying voltage across said coil conductor terminals of said at least one coil.

38. The method of claim 37, further comprising providing a coil support platter rotatably coupled to said magnet assembly, said at least one coil being fixedly coupled to said coil support platter.

39. The method of claim 38, wherein said coil support platter comprises a first printed circuit board having first circuitry; and wherein said method further comprises;
providing a second printed circuit board having second circuitry, said second printed circuit board being fixedly coupled to said magnet;
providing a dynamic signal interface between said first circuitry of said first printed circuit board and said second circuitry of said second printed circuit board; and
transmitting at least one signal from said first circuitry to said second circuitry across said dynamic signal interface.

40. The method of claim 39, wherein said first and second circuitry comprise servo mechanism operational circuitry.

41. The method of claim 37, wherein said coil assembly is a moving coil assembly; wherein said magnet assembly is a stationary magnet assembly; and wherein said method comprises imparting rotation to said moving coil assembly.

42. The method of claim 37, wherein said coil assembly is a stationaly coil assembly; wherein said magnet assembly is a moving magnet assembly; and wherein said method comprises imparting rotation to said moving magnet assembly.

43. The method of claim 37, further comprising providing an optical block coupled to one of said coil assembly or said magnet assembly so that said optical block is rotatable with said one of said coil assembly or said magnet assembly relative to the other of said coil assembly or said magnet assembly, said one of said coil assembly or said magnet assembly being coupled to said optical block so as to directly drive and impart rotation to said optical block; and imparting rotation to said optical block by applying voltage across said coil conductor terminals of said at least one coil to impart rotation to said one of said coil assembly or said magnet assembly to which said optical block is coupled.

44. The method of claim 43, wherein said optical block comprises a closed circuit television camera optical block.

45. The method of claim 37, wherein said one-piece continuous rare earth magnet comprises a neodymium iron boron magnet or a samarium cobalt magnet.

46. The method of claim 45, wherein said one-piece continuous rare earth magnet comprises a neodymium iron boron magnet.

47. The method of claim 37, wherein said one-piece continuous rare earth magnet is cast in a full ring shape.

48. A method of rotating an optical block assembly, comprising:
providing a servo mechanism, said servo mechanism comprising:
a coil assembly including at least one motor coil having coil conductor terminals, and a coil support platter comprising a first printed circuit board having first circuitry and first dynamic interface components, said at least one coil being fixedly coupled to said coil support platter,
a magnet assembly rotatably coupled to said coil assembly so that one of said coil assembly or said magnet assembly is a moving assembly that rotates in response to application of voltage across said coil conductor terminals of said at least one coil and the other of said coil assembly or said magnet assembly is a stationary assembly, said magnet assembly comprising a continuous magnet having at least two sets of poles, and a second printed circuit board fixedly coupled to said magnet, said second printed circuit board having second circuitry and second dynamic interface components electrically coupled to said first dynamic interface components,
wherein said first dynamic interface components of said first printed circuit board and said second dynamic interface components of said second printed circuit board together form a dynamic signal interface between said first circuitry of said first printed circuit board and said second circuitry of said second printed circuit board,
wherein said first and second circuitry comprise position feedback circuitry;
providing an optical block coupled to said moving assembly of said servo mechanism so that said optical block rotates with said moving assembly of said servo mechanism relative to said stationary assembly of said servo mechanism, said moving assembly of said servo mechanism being coupled to said optical block so as to directly drive and impart rotation to said optical block;
imparting rotation to said optical block by applying voltage across said coil conductor terminals of said at least one coil of said coil assembly; and
transmitting at least one signal from said first circuitry to said second circuitry across said dynamic signal interface.

49. The method of claim 48, wherein said continuous magnet comprises a one-piece rare earth magnet.

50. The method of claim 49, where said coil assembly comprises a plurality of motor coils, said plurality of motor coils being fixedly coupled to said coil support platter in a configuration so that at least one of said motor coils is positioned across a pole boundary between individual poles of at least one of said at least two sets of poles in all relative rotational positions of said moving assembly and said stationary assembly.

51. The method of claim 50, wherein said coil assembly is said moving assembly; and wherein said magnet assembly is said stationary assembly.

52. The method of claim 51, wherein said one-piece continuous magnet is configured in a full ring shape; and wherein said method further comprises imparting rotation to said optical block through 360 degrees of rotation by applying voltage across said coil conductor terminals of said at least one coil of said coil assembly.

53. The method of claim 52, wherein said moving coil assembly is configured to impart rotation to said optical block in a pan axis direction; and wherein said method further comprises imparting rotation to said optical block in a pan axis direction by applying voltage across said coil conductor terminals of said at least one coil of said coil assembly.

54. The method of claim 51, wherein said one-piece continuous magnet is configured in a partial ring shape; and wherein said method further comprises imparting rotation to said optical block through less than 360 degrees by applying voltage across said coil conductor terminals of said at least one coil of said coil assembly.

55. The method of claim 54, wherein said moving coil assembly is configured to impart rotation to said optical block in a tilt axis direction; and wherein said method further comprises imparting rotation to said optical block in a tilt axis direction by applying voltage across said coil conductor terminals of said at least one coil of said coil assembly.

56. The method of claim 49, wherein said first and second circuitry comprise image processing circuitry, servo mechanism operational circuitry, or a combination thereof.

57. The method of claim 56, wherein said coil assembly is said moving assembly; and wherein said stationary assembly is said magnet assembly.

58. The method of claim 57, wherein said optical block comprises a closed circuit television camera optical block.

59. A coil assembly for a servo mechanism, comprising:
- at least one motor coil having coil conductor terminals; and
- a coil support platter comprising a first printed circuit board having first circuitry and first dynamic interface components, said at least one coil being fixedly coupled to said coil support platter;
- wherein said coil assembly is configured to be rotatably coupled to a magnet assembly comprising a second printed circuit board, said second printed circuit board having second circuitry and second dynamic interface components;
- wherein said first dynamic interface components of said first printed circuit board are configured to form a dynamic interface together with said second dynamic signal interface components of said second printed circuit board so that said dynamic signal interface electrically couples said first circuitry of said first printed circuit board to said second circuitry of said second printed circuit board; and
- wherein said first and second circuitry comprise position feedback circuitry.

60. A servo mechanism, comprising:
- a coil assembly, said coil assembly comprising at least one motor coil integrated with a printed circuit board and first circuitry; and
- a magnet assembly, said magnet assembly comprising second circuitry and a one-piece continuous magnet having at least two sets of poles and being configured in a full ring shape;
- wherein said coil assembly and said magnet assembly are rotatably coupled together in operative relationship; and
- wherein said first and second circuitry comprise position feedback circuitry.

61. The servo mechanism of claim 60, wherein said one-piece continuous magnet comprises a rare earth magnet.

62. The servo mechanism of claim 61, wherein said position feedback circuitry comprises circuitry configured to sense magneto resistive effects.

63. The servo mechanism of claim 61, wherein one of said coil assembly or said magnet assembly is configured to be coupled to and directly drive an optical block so as to impart rotation to said optical block.

* * * * *

UNITED STATES PATENT AND TRADEMARK OFFICE
CERTIFICATE OF CORRECTION

PATENT NO. : 7,071,591 B2
APPLICATION NO. : 10/732195
DATED : July 4, 2006
INVENTOR(S) : Hovanky et al.

It is certified that error appears in the above-identified patent and that said Letters Patent is hereby corrected as shown below:

In claim 42, column 19, line 35, delete "stantionaly," and insert --stationary--.

Signed and Sealed this

Third Day of October, 2006

JON W. DUDAS
*Director of the United States Patent and Trademark Office*